March 14, 1939.  J. E. GORMAN  2,150,276
REFRIGERATING UNIT
Filed Jan. 12, 1937  2 Sheets-Sheet 1
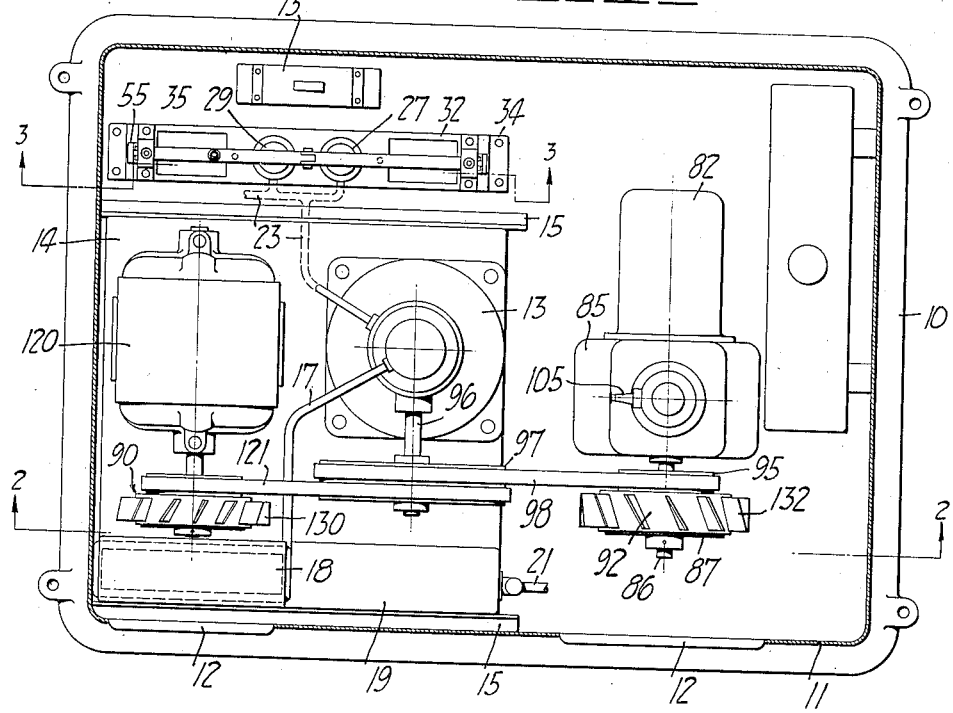
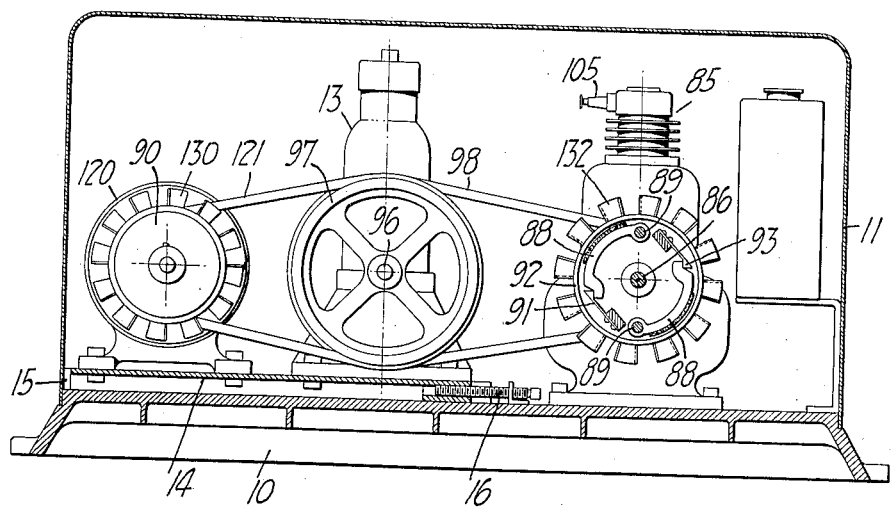
INVENTOR.
Jesse E. Gorman
BY
ATTORNEY.

March 14, 1939.  J. E. GORMAN  2,150,276
REFRIGERATING UNIT
Filed Jan. 12, 1937   2 Sheets-Sheet 2
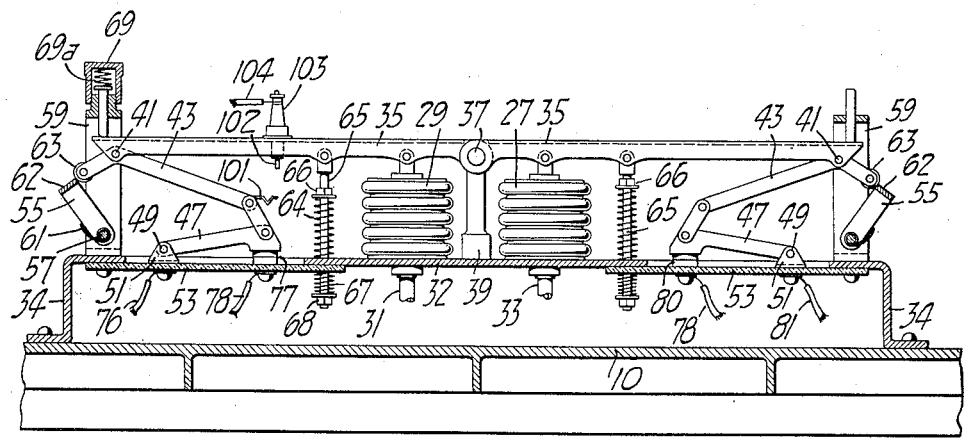
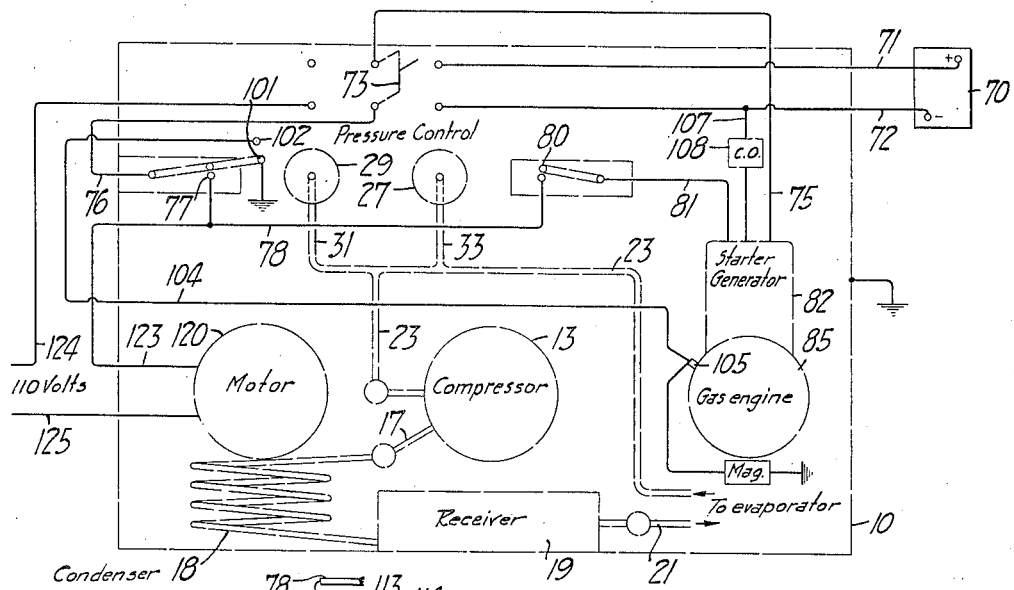
INVENTOR.
Jesse E. Gorman
BY
ATTORNEY.

Patented Mar. 14, 1939

2,150,276

UNITED STATES PATENT OFFICE 2,150,276

REFRIGERATING UNIT

Jesse E. Gorman, Oakland, Calif., assignor to E. L. Kennedy, Oakland, Calif.

Application January 12, 1937, Serial No. 120,151

2 Claims. (Cl. 62—115)

The present invention relates to refrigerating and lighting apparatus, and particularly to portable refrigerating units adapted for use in automobile trailers, rural homes, and the like.

The current popularity of automobile trailers among tourists has created a demand for a portable power operated electric lighting and refrigerating unit capable of operation either upon standard lighting and power circuits available in trailer camps or by a self-contained source of power when such external power is not available. Under all circumstances it is desirable that the operation of the unit be automatically controlled so as to maintain a safe temperature in the refrigerating compartment.

Having in mind the foregoing requirements for such apparatus, it is an object of the present invention to provide a unit of the class described which may be selectively operated by either of two sources of power.

It is a further object of the invention to provide automatic temperature responsive control devices whereby either of the sources of power selected for operation may be controlled so as to maintain a safe temperature in the refrigerating compartment.

It is a further object of the invention to provide automatic control devices for battery charging operable as an incident to the operation of the unit.

The foregoing, together with various other objects and advantages will be apparent from the following description of an embodiment of the invention, the novel features thereof being particularly pointed out in the accompanying claims.

In the accompanying drawings illustrating a preferred embodiment of the invention, and referred to in the following description:

Figure 1 is a plan view of the compressor operating and control unit, the casing thereof being sectioned to show the arrangement of the various devices comprised therein;

Figure 2 is a vertical sectional view of the said unit, taken on the line 2—2 of Figure 1;

Figure 3 is a detail view in elevation of certain of the control devices;

Figure 4 is a diagrammatic view of the electrical and fluid circuits; and

Figure 5 is a detail view in elevation of a modified form of one of the control devices.

The refrigerating system in connection with which the present invention is herein disclosed comprises, in general, a conventional form of evaporator (not shown) into which refrigerant is released through a regulator valve adjusted to maintain the desired temperature in the refrigerating coils associated therewith and disposed in a refrigerating compartment. These coils are connected to a compressor and to a condenser so as to maintain refrigeration according to the well known compression cycle.

The compressor with its operating and controlling devices is mounted upon a metal base 10 (Figures 1 and 2) within a cover 11 provided with louvres 12 for the ingress and egress of air for cooling. The compressor 13, of conventional construction, is secured to a supporting plate 14 slidably retained in ways 15 fixed to the base 10, so that the said plate 14 may be adjusted by means of screw 16 to take up any slack in the belt drive from the gas engine to the compressor.

The discharge of the compressor passes through a conduit 17, preferably of metal tubing, to a condenser 18 also supported on the plate 14, whence the refrigerant passes to a receiver 19 and then through conduit 21 to the evaporator (not shown) and back through conduit 23 to the intake side of the compressor 13, completing the cycle.

The refrigerant is discharged into the refrigerating coils through a valve arrangement, designed to effect evaporation of the refrigerant to remove heat from the compartment housing said coils. This valve arrangement may be of any of several well known types, in one of which a float valve is used to maintain a constant level of liquid refrigerant in an evaporator connected to the refrigerating coils in which a partial vacuum is maintained by the compressor under control of the automatic devices hereinafter described. In another of which the refrigerant is discharged into the coils through a valve opened and closed by devices responsive to changes of temperature within the refrigerating compartment. It will be apparent that, whichever type of valve arrangement is selected, the pressure in the conduit 23 will be proportional to the temperature of the refrigerating compartment, and this pressure is therefore utilized to control operation of the compressor.

Pressure responsive devices such as collapsible metal bellows 27 and 29 (Figures 1 and 3) are connected to conduit 23 by branch conduits 31 and 33, respectively, the said conduits opening into the sealed interiors of the said bellows so that the latter are collapsed as the pressure decreases in the conduit 23. Each of these pressure responsive devices acts through a lever system connected therewith to control switching devices for initiating operation of the compressor.

For this purpose, the bellows 27 and 29 (see Figure 3) are mounted upon a plate 32 supported on base 10 by brackets 34 and to the upper end of each there is pivotally connected one of the levers 35 which are independently pivoted on a cross arm 37 of standard 39. Pivotally mounted at 41 adjacent the free end of each lever 35 is an angular lever 43 connected by an intermediate link with a switch arm 47 pivotally mounted at 49 on a contact element 51 fixed in an insulating plate 53 set into an aperture in the plate 32. Cooperating with each of the levers 43 to rock the same about its pivot 41 upon movement of its lever 35 by the associated bellows, is an arm 55 pivoted at 57 on a standard 59 and urged toward the lever 43 by a spring 61. An angularly offset portion 62 of each arm 55 is thus pressed against a roller 63 journalled in the end of the associated lever 43 and serves to rock it suddenly in one direction or the other about its pivot 41 as the associated lever 35 is raised or lowered.

Springs 64 surrounding threaded rods 65, pivotally connected to levers 35 and passing through apertures in plates 32 and 53, are compressed between plate 32 and nuts 66 by adjustment of which the compression of the said springs may be varied to predetermine the degree of evacuation of the pressure responsive devices 27 and 29 which will be necessary in order to trip the switch arms 47, respectively. These springs are preferably partially counterbalanced by springs 67 surrounding said rods 65 and compressed between plates 53 and adjustable nuts 68 threaded onto the lower ends of said rods, and a finer counterbalance may, if desired, be obtained by adjustment of a cap nut 69 to vary the compression of a spring 69ª disposed within the same and pressing down upon the free end of lever 35 through a rod.

These pressure responsive devices through the above described linkages control the opening and closing of contacts 77 which are connected in series in the circuit of a starting motor 82 for an internal combustion engine adapted to drive the compressor. A storage battery 70 (Figure 4) for supplying power to the starter is connected by leads 71 and 72 to a switch 73 which, when the device is to be conditioned for operation by the internal combustion engine, is thrown to connect lead 71 to lead 75 running to the starter, and to connect lead 72 to lead 76 running to one of a pair of contacts 77 controlled by the pressure responsive device 29. From contacts 77 lead 78 runs to one of a pair of contacts 80 controlled by the pressure responsive device 27 whence lead 81 is adapted to convey current to the starting motor 82.

The operation of an internal combustion engine 85, which is preferably of the smallest practicable size, is initiated by operation of the starting motor 82, and the compressor 13 of the refrigerating system is driven thereby to pass refrigerant into the condenser 18 and thus reduce the pressure in conduit 23. This drive is effected through a clutch mechanism which is normally disengaged, but is engaged by the centrifugal forces incident to operation of the internal combustion engine, for a purpose to be described hereinafter.

Fixed on the shaft 86 of the internal combustion engine 85 (Figure 2) is a disc 87 to which a plurality of driving shoes 88 are pivotally secured as at 89. Leaf springs 91 also secured at one end to disc 87, normally rock the shoes 88 toward the center of disc 87 permitting the drum 92, which is freely rotatable on shaft 86, to rotate independently to the said shaft, but upon rotation of shaft 86 by operation of the engine 85, the springs 91 will be overcome by the centrifugal force acting upon the shoes 88 and the latter will be moved into frictional driving engagement with the inside surface of drum 92. As the shoes 88 move into this driving position their free ends are adapted to ride upon cam projections 93 on the free ends of springs 91 so that the force exerted by the latter will throw the shoes out of driving position when the speed of the shaft 86 is sufficiently reduced.

Formed integrally with the drum 92 (Figure 1) is a pulley 95 and, in alignment therewith and fixed upon the shaft 96 of the compressor 13, is a double sheave pulley 97 over which belt 98 is tensioned to transmit the drive from drum 92 to the compressor 13. Thus, upon operation of the internal combustion engine 85, the compressor 13 will be operated.

This decrease of pressure in conduit 23 is utilized to first disconnect the starter windings of the starter-generator 82 from the battery 70, and subsequently to stop the internal combustion engine 85 by disabling the ignition system thereof. Then as the pressure in conduit 23 rises the engine's ignition system is reenabled and the starter is again operated to initiate compression.

The pressure responsive device 27 (Figure 3) is provided for the purpose of disconnecting the starter windings of the starter-generator from the battery, while the pressure responsive device 29 controls the interruption of the operation of the engine 85 and its restarting. In order to adjust the illustrated devices to function in this manner, the spring 64 associated with bellows 29 is placed under substantially greater compression than the corresponding spring 64 associated with bellows 27, so that as the pressure in conduit 23 falls, contacts 80 will be opened by the collapse of bellows 27 somewhat before contact 101 carried on the lever 43 controlling contacts 77 is carried into contact with point 102 mounted in an insulating bushing 103 on lever 35 and connected by lead 104 (see also Figure 4) with the ungrounded side of the magneto energized spark plug 105, to ground the spark plug and stop the engine 85.

Also the compression of spring 64 is preferably adjusted, as heretofore described, to delay the reopening of contacts 101 and 102 and the concomitant reclosing of contacts 77 until after the increasing pressure in conduit 23 has effected reclosing of contacts 80. In this way the refrigeration compartment temperature at which compression will be initiated will be controlled by the adjustment of spring 69ª, while the temperature at which it will be interrupted will be controlled by the adjustment of spring 64, both associated with the pressure responsive device 29, and the other device 27 will control only the cutting out of the starter windings of the starter-generator 82.

While the foregoing is the preferable order of operation of the pressure responsive controls, it is not essential that contacts 80 reclose before contacts 77, and the springs associated with the device 27 may be so adjusted as to effect reclosing of contacts 80 after contacts 77 have reclosed. Such adjustment will, however, place restarting of the compressor under control of the device 27 when the unit as a whole is set for internal combustion engine operation, while such restarting is necessarily controlled by the other device 29 when the unit as a whole is set for operation by the other power source, as will hereinafter appear. The temperature range of the refrigerating compartment will therefore be slightly different under the two settings unless the preferred adjustment is effected.

Under either adjustment the starter-generator 82 may function during operation of the engine 85, notwithstanding the opening of contacts 80, to recharge the battery 70, being provided for this purpose with generator windings connected to lead 72 by lead 107 through the usual centrifugal cut-out 108 to prevent the battery 70 from discharging through the generator windings when the engine 85 is not operating.

As an alternative, a centrifugal switch may also be substituted for the pressure responsive device 27 to control the cutting out of the starter windings of the starter-generator 82 after the engine 85 has commenced to operate. Such a switch is controlled by rotation of the shaft 86, remaining closed at the speed at which the engine 85 is cranked by the starter-generator 82 but opening at the speed at which engine 85 operates under its own power, and its contacts are disposed in the circuit in the place of the contacts 80.

One form of such an arrangement is illustrated in Figure 5 in which there is fixed on the engine shaft 86 a disc 110 on which is pivotally mounted at 111 a lever 112 disposed radially on the said disc and having one end offset as at 113 so that centrifugal force incident to rotation of the shaft 86 will tend to rock the lever clockwise about its pivot 111, such movement being resisted by a spring 114, the compression of which may be adjusted by screw 115. As the lever 112 is thus rocked it is pressed against the stationary rod 116, of insulating material and axially aligned with shaft 86, to flex spring contact leaves 117 and 118, separate contacts 80 and close contacts 108, all of which are supported on a frame member. By reference to Figure 4, it will be seen that contacts 80 control the cutting out of the starting windings while contacts 108 control the connection of the generator windings to the battery 70.

When external power is available for the operation of the present device, as for instance when a trailer on which the device is being used is in a camp having plug-in connections to a standard power circuit, the switch 73 (Figure 4) may be set to condition the device for automatic operation on such a circuit.

For such operation, a conventional electric motor 120 (Figures 1 and 2), preferably of the type adapted for either alternating or direct current operation, is mounted on plate 14 adjacent the compressor 13 and connected to drive the latter through a centrifugal clutch 90 which may be identical in construction with that described in connection with the drive of the compressor by engine 85 and therefore will not be described in detail. The driven side of this clutch 90 is connected by belt 121 with pulley 97 fixed upon the compressor shaft 96 so that upon operation of the motor 120 the centrifugal clutch 90 will be engaged and the compressor will be driven with the same effect as hereinabove described in connection with its operation by engine 85.

Control of the operation of motor 120 is effected by pressure responsive device 29 alone, the device 27 being idle when this motor is effective. Referring to Figure 4, it will be seen that one side of the power supply line of motor 120 passes via lead 123 to contacts 77, the operation of which under control of the pressure responsive device 29 has been described. From contacts 77, lead 76 passes to switch 73 which, when thrown to condition the unit for electric power operation, connects this lead to one side 124 of the external power supply circuit. The other side 125 of this circuit is connected directly to the motor 120.

Referring to Figure 1, it will be seen that the motor 120 is preferably mounted adjacent the condenser 18 through which it is desirable to circulate air. For this purpose, fan blades 130 are mounted upon the periphery of the driven member of the centrifugal clutch 90 and arranged to induct air through the louvres 12 at the left side of the cover 11. This air passes first through the condenser 18 and then circulates through the unit to cool next the compressor 13 and finally the engine 85, being discharged through the louvres 12 at the right side of the cover 11 by similar fan blades 132 mounted on the driven member of the centrifugal clutch through which engine 85 is adapted to drive the compressor.

It will be observed that since these fans are mounted upon the driven members of their respective centrifugal clutches, both will be operated whenever either engine 85 or motor 120 is driving the compressor, but it will not be necessary either for engine 85 to drive motor 120 or for the latter to drive the former in order to effect such air circulation.

It is also apparent that operation of the engine 85 will effect charging of the battery 70 by means of the generator 82, and the battery is thus rendered available for use in energizing a lighting system as well as for restarting the engine, as above described.

In the foregoing specification a preferred form of a device embodying the invention has been disclosed, but it is understood that many variants may be constructed according to the skill of those engaged in the art. The invention therefore, is not to be considered as limited except as required by the prior art, and the spirit of the appended claims.

I claim:

1. In a refrigerating unit comprising a compressor having two power units connected thereto to drive the same alternatively; the combination of air circulating means mounted upon each of said power units, a releasable connection between each of said power units and the aforesaid air circulating means mounted thereon, and a driving connection between each of said power units and the aforesaid air circulating means mounted on the other of said power units, whereby either power unit may operate both of said air circulating means independently of the other of said power units.

2. In a refrigerating unit comprising a compressor having two power units connected thereto to drive the same alternatively; the combination of air circulating means mounted upon each of said power units, a releasable connection between one of said power units and the aforesaid air circulating means mounted thereon, said air circulating means having a driving connection with the other of said power units whereby the latter may operate both of said air circulating means independently of the aforesaid releasably connected power unit.

JESSE E. GORMAN.